Dec. 17, 1940.  L. ROBIN ET AL  2,225,278
DRIVING DEVICE
Filed Nov. 12, 1936  4 Sheets-Sheet 1
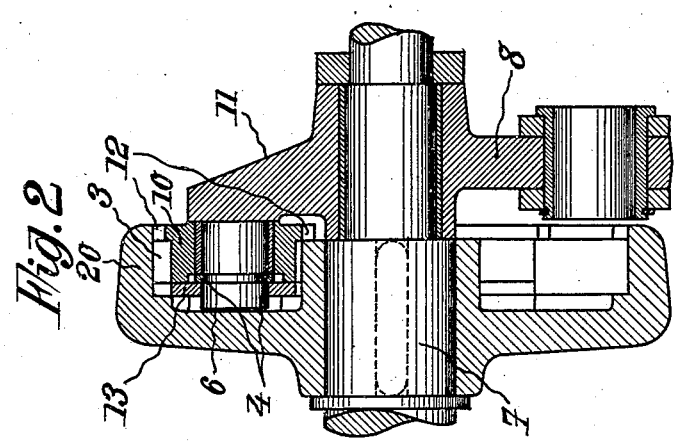
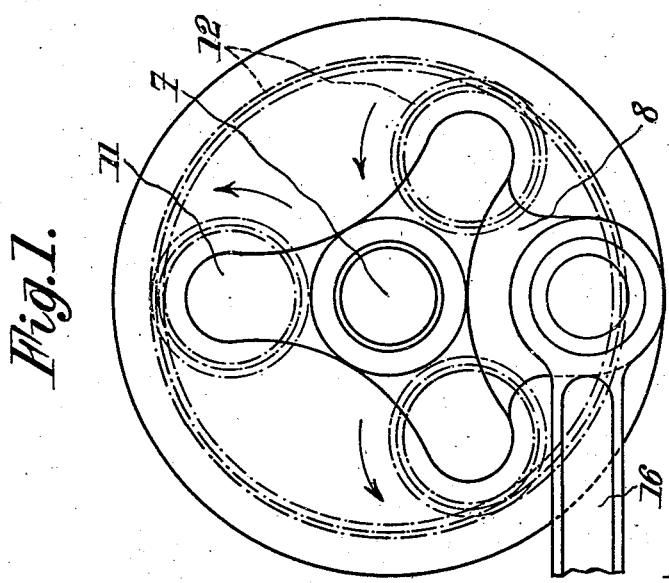
Inventors
Léo Robin,
Mathieu van Roggen,
Attorneys

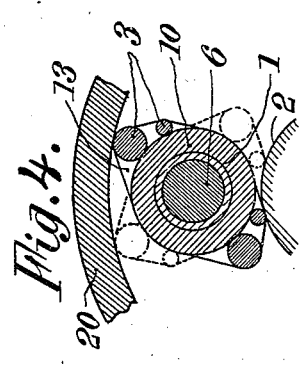
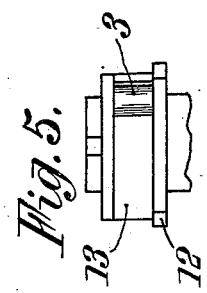
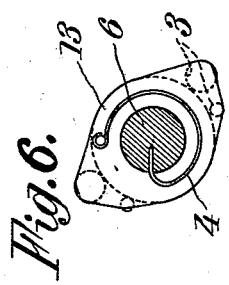
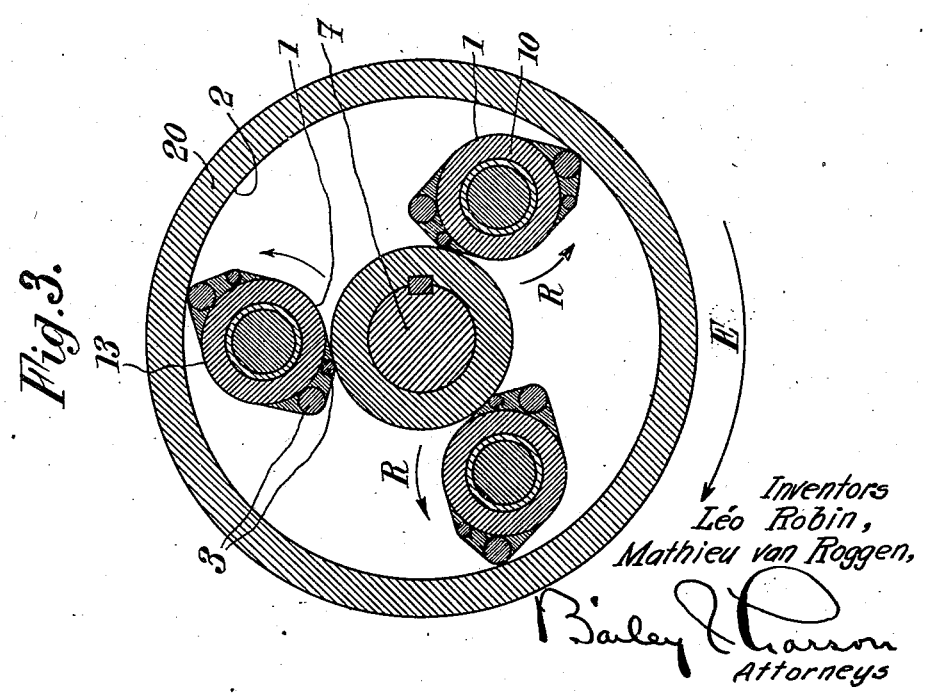
Inventors
Léo Robin,
Mathieu van Roggen,
Bailey Larson
Attorneys

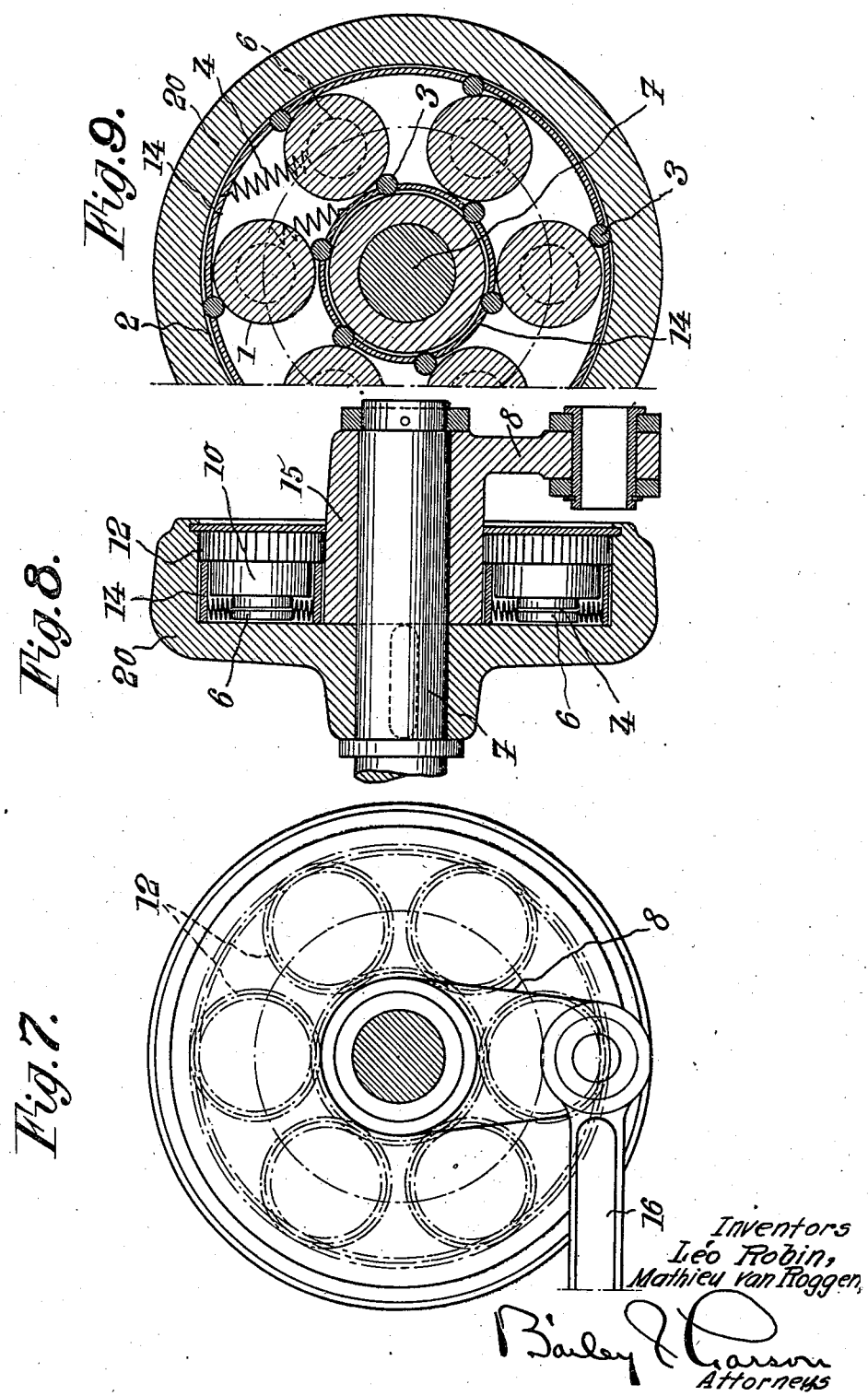

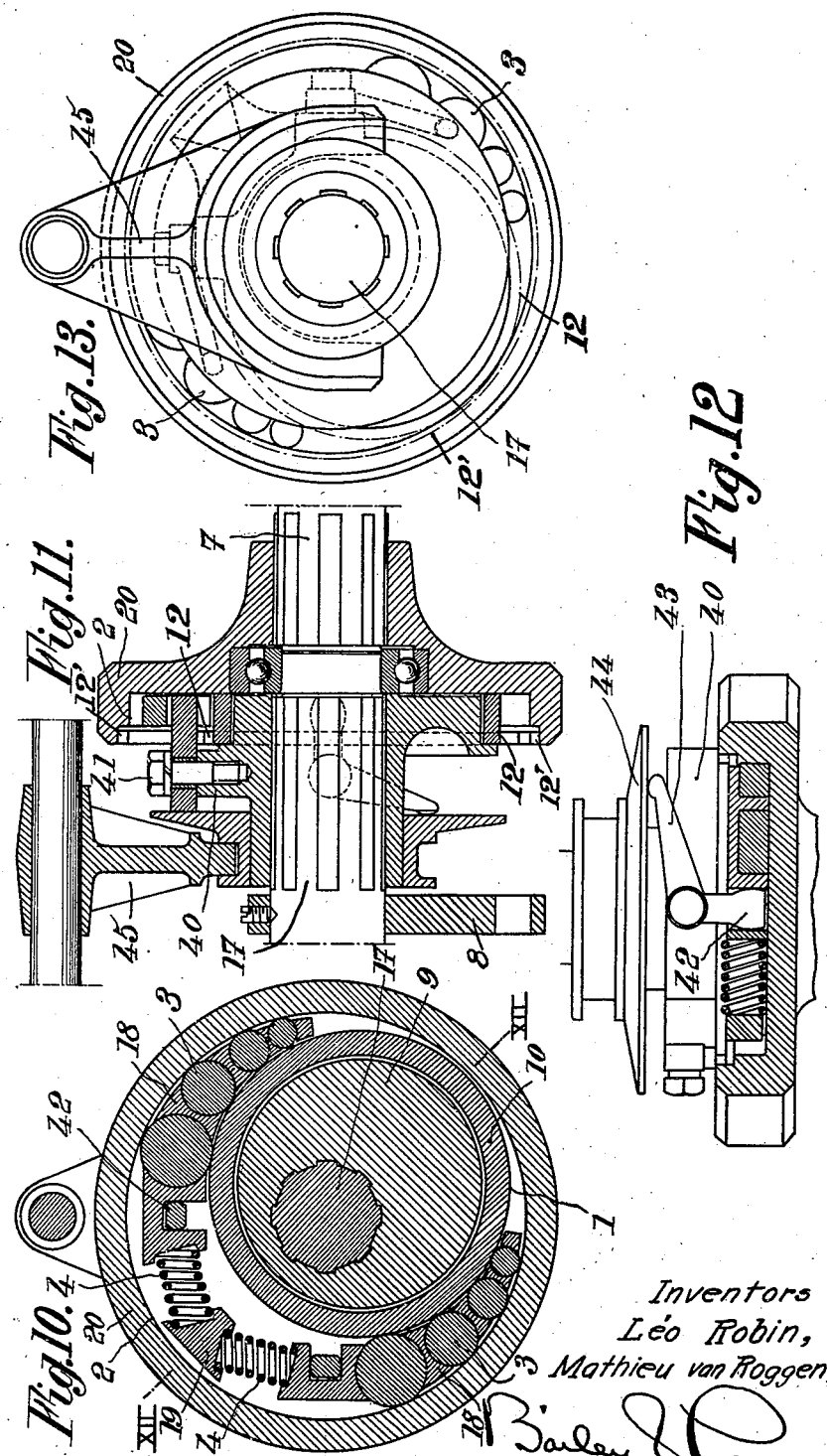

Patented Dec. 17, 1940

2,225,278

UNITED STATES PATENT OFFICE 2,225,278

DRIVING DEVICE

Leo Robin and Mathieu van Roggen, Sprimont, Belgium

Application November 12, 1936, Serial No. 110,527
In Belgium November 21, 1935

7 Claims. (Cl. 192—48)

The present invention relates to driving devices to be interposed between two members to be driven one by the other, and especially to driving devices of the free wheel type.

The object of the present invention is to provide a driving device of this type which is better adapted to meet the requirements of practice than devices of the same type used up to the present time, and especially a driving device which permits of obtaining a positive drive, without slipping which avoids any excessive pressure upon the driving surfaces, and finally which permits of obtaining movements of any amplitude whatever, in opposition with what takes place with free-wheels of the ratchet or similar types.

According to the essential feature of the present invention, the two elements to be driven one by the other are provided with respective surfaces adapted to roll upon each other when the said elements undergo relative displacements, said surfaces having their rolling displacements preferably interconnected in a positive manner, for instance by means of teeth, and we interpose between these surfaces at least one obstacle adapted to cooperate therewith in such manner that for one of the directions of this rolling movement, it opposes said rolling displacements in a positive manner, thus rendering the two elements rigid with each other, which permits the drive of one of the elements by the other for the direction of drive that tends to produce said direction of the rolling movement, whereas, on the contrary, said obstacle does not oppose the rolling movement in the opposite direction.

Another feature of the present invention, which is based upon the property of the device according to the invention of permitting the disengagement of the obstacle, even under load, consists in combining with these devices means for disengaging at will said obstacle, in such manner that it is possible to obtain, for instance, either a free-wheel arrangement or a positive coupling, with, in both cases, the possibility of eliminating, at any time, and even under load, any connection between the two elements that are considered.

Other features of the present invention will be apparent from the following detailed description of some specific embodiments thereof.

Preferred embodiments of the present invention will be hereinafter described, with reference to the accompanying drawings, given merely by way of example, and in which:

Figs. 1 to 3 inclusive diagrammatically show, in elevational view, in axial section, and in transverse section, respectively, a device made according to the invention;

Fig. 4 shows in section, in two different working positions, certain elements of the device of Figs. 1 to 3;

Figs. 5 and 6 show the same elements, in plan view and in elevational view, respectively;

Figs. 7 to 9 inclusive show, in elevational view, in axial section, and in transverse section, respectively, a device of the same kind made according to another embodiment.

Figs. 10 to 13 diagrammatically show, in transverse section, in axial section, in section on the line 12—12 of Fig. 10, and in side view, respectively, a coupling device made according to another embodiment of the invention.

As above explained, the invention is intended to ensure the coupling of two members, whatever be the nature of said members, and whether they are intended to move both with a continuous motion, or, on the contrary, with a reciprocating motion, or again one with a continuous motion and the other with a reciprocating motion.

According to the invention, this coupling device includes at least two rolling surfaces adapted to roll with respect to each other under the effect of the relative displacement of the members to be driven by each other, this rolling movement being obtained through any suitable means.

Between these surfaces there is interposed at least one obstacle capable of cooperating therewith in such manner that, for one of the directions of the rolling movement, it opposes such a movement in a positive manner whereas, on the contrary, rolling displacements can take place in the opposite direction without producing the drive.

Such a result can be obtained in various ways.

For instance, the shape and arrangement of the surfaces 1 and 2 that coact with the obstacle, that is to say the nature of the rolling movement, may be of different kinds.

If both surfaces are closed surfaces, the rolling movement may be of the hypocycloidal type or of the epicycloidal type or again of both types simultaneouly (Figs. 1 to 9).

Of course, this disclosure does not exclude the possibility, according to the invention, of making use of other kinds of rolling movements.

The devices according to the invention may also differ by the nature of the obstacle above referred to. In the simplest embodiment, this obstacle consists essentially of a roller 3 which is in simultaneous contact with both surfaces 1 and 2, toward which it is preferably, for this purpose, urged by an auxiliary action, for instance an elastic action such as that exerted by a spring 4, it being well understood that this obstacle may be made in many different manners, such for instance as those that will be hereinafter described.

Before describing the details of construction of driving devices according to the present invention, we will first explain their principle of operation.

In the diagrammatic embodiment of Figs. 1 to 3, the driving member consists of a movable frame 11 carrying a spindle 6 on which is mounted a cylindrical rolling surface 1. The displacements of this frame cause this surface to roll with respect to a surface 2 which is either carried by the element to be driven or connected therewith in any suitable manner.

It will be readily understood that, with such an arrangement, when the frame 11 moves in a given direction (which is the driving direction and is designated by arrow E) the rolling movement of surface 1 upon surface 2 tends to take place in a direction (designated by arrow R in the same figures) for which roller 3 wedges said two surfaces with respect to each other. Therefore, as the rolling displacement of said surfaces with respect to each other is made impossible, the whole becomes rigid, that is to say the frame 11 drives surface 2 and therefore the element to be driven together with itself, and this in a positive manner, without any sliding displacement being possible.

If, on the contrary, the frame 11 moves in the opposite direction, the direction of the rolling movement is itself reversed and it is clear that roller 3, even if it is elastically applied against the two surfaces 1 and 2, does not oppose their rolling upon each other since this rolling movement tends to drive out the roller.

It should be noted that, contrary to what takes place in free wheel systems with ratchets or of the wedging type, the drive through roller 3 takes place in an instantaneous manner, since this roller absolutely prevents rolling in direction R.

Furthermore, no excessive stress is exerted by the roller upon surfaces 1 and 2, contrary to what takes place in the case of conventional free-wheel devices of the wedging type, in which the drive is obtained only when an important thrust has been developed, which does not exclude the possibility of a relative slipping of the parts.

In each case, the rolling of surfaces 1 with respect to surfaces 2, or inversely, may take place:

a. Either by mere contact; or
b. According to a preferred arrangement, in a positive manner, which is obtained for instance by fitting either a portion of said surfaces or elements rigid therewith with systems of teeth capable of meshing with one another.

According to this last mentioned arrangement, which will now be exclusively considered in what follows, it is possible either to leave surfaces 1 and 2 in contact, or, on the contrary, to provide between them a certain play, in any case suitably smaller than the minimum thickness of the rollers or other obstacles.

According to the embodiment of Figs. 1 to 6, which relates both to the hypocycloidal and to the epicycloidal rolling systems, the device is made as follows:

One of the two elements to be driven by each other, for instance the driving element, consists of a frame 11 coaxial with the driven shaft 7 and mounted for instance loose on a prolonged part thereof. This frame carries the spindles 6 on which are mounted rings 10 the outer surface of which corresponds to surfaces 1 above mentioned.

The driven element consists of plate 20 rigid with the driven shaft and including two smooth annular members internal and external with respect to rings 10 and which correspond to surfaces 2 above referred to.

The positive connection between surfaces 1 and 2 is ensured by means of systems of teeth 12 which may be provided, on the one hand, on surfaces 1 of rings 10, and, on the other hand, on one or the other of the two surfaces 2, preferably on one of the edges of these various surfaces the width of which remains free to coact with the elements acting as obstacles as above explained.

Finally, the elements acting as obstacles are constituted for instance by rollers 3.

These rollers 3 may be carried by cages 13 mounted on spindles 6 and including each at least two rollers 3 coacting with the two surfaces 2 (the roller that coacts with the inner surface may be of smaller diameter), these cages being subjected to the action of springs 4 interposed between spindles 6 and said cages.

The connection between cages 13 and the members by which they are supported may be made in such manner that it permits movement of these members, under the control of the systems of teeth 12 described above and shown particularly in Fig. 2, into one or the other of two positions such as shown respectively in solid lines and in dotted lines in Fig. 4, which positions correspond to two different directions of drive, a suitable number of rollers being then provided for ensuring the correct working in both of these positions.

According to the embodiment of Figs. 7 to 9, the inner surface 2 above referred to with respect to Figs. 1 to 6 is provided no longer on plate 20 but on a hub 15 mounted loose on shaft 7. Furthermore the positive connection by means of teeth 12 is provided as well between planet wheels 10 and plate 20 as between the same planet wheels and the hub or sun-wheel 15.

Such a system, completed by obstacles constituted for instance by ball cages 14 connected through springs 4 with the freely mounted spindles 6 of the planet-wheels, may receive the movement either from plate 20, or again from hub 15, as shown. In the latter case, supposing for instance that this movement is a reciprocating motion of an amplitude lower than 180°, transmitted through a connecting rod 16, it is clear that, for one of the two alternating strokes, the system forms a rigid group, as if crank 8 were rigid with shaft 7, whereas, for the other stroke, the inverse movements of hub 15 merely serve to rotate the planet-wheels. In a likewise manner, if the hub is supposed to be stationary, shaft 7 can rotate in a free-wheel manner in the direction of the driving movement, producing the rotation of the sun-wheels at the same time as the revolution movement of their axes at a speed which is one half of that of shaft 7.

In the modification of the invention illustrated by Figs. 10 to 13 inclusive, the rolling surfaces are carried by annular members 10 and 20 provided, respectively, with meshing gear teeth 12' and 12. Member 10 turns with respect to an eccentric 9 rigid with shaft 17, which is, for instance rigid with the driving shaft. As for member 20, it is rigid with a plate keyed on shaft 7 which is the driven shaft. The obstacle consists of at least one roller or ball, interposed between these surfaces, or, as shown, of a series of rollers 3 carried by a cage 18 which is subjected to the action of spring 4, which bears, on the other hand, upon a stationary abutment 19 fixed with respect to shaft 17.

Considering, in a device of this kind, the angle under which takes place the positive coupling by means of the obstacle, there exists for this angle a limit value. When this value is exceeded, the coupling no longer takes place, unless the obstacle is maintained by a force at least equal to its reaction.

It follows that for all angles approximating the limit angle, only a small effort is necessary, even when the system is working under load, for releasing the two shafts with respect to each other.

If the angle that is chosen is smaller than the limit angle, the effort necessary for disengaging the parts will be the smaller as the angle is closer to the limit angle.

If the angle that is chosen is greater than the limit angle, and if the obstacle is maintained by a spring such as 4, the effort necessary for producing the disengagement of the parts will be equal to the pressure of the spring less the effort for ejecting the obstacle.

Therefore, being given a device such as that above described, we combine therewith, according to the present invention, means capable of eliminating the coupling action at any desired time by acting directly upon the obstacle.

It is thus possible, by means of such an arrangement, to obtain a coupling device which can be disengaged at will, in the same manner as a clutch. In the several forms in which the invention may be embodied, the drive may be positive, that is to say, capable of producing the drive, in both directions if two obstacles acting in opposite directions are provided, as shown by the drawings.

The means in question may consist of crank levers mounted in a pivoting manner about spindles 41 on a piece 40 rigid with eccentric 9 and therefore rigid with shaft 17. An arm 42 of said levers acts upon the corresponding cage 18, whereas the other arm 43 can be actuated by a plate 44 movable by means of a fork 45.

Such a device is equivalent to a dog clutch although it can be released when subjected to a load, which is not the case for dog clutches, wedges, spindles, pawls, and the like.

It can be used in connection with various apparatus, such as automobiles, lifts, hoisting machines, elevator chains, and so on.

In a general manner, while we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. A device of the type described for transmitting movement from one part to another part, which comprises, in combination, two members connected with said parts respectively having cooperating respective circular rolling surfaces, engaging gear means secured to said members so as to ensure rolling movement between said rolling surfaces under the effect of relative displacements of said members with respect to each other, obstacle means adapted to cooperate with both of said surfaces so as to oppose rolling displacements of said surfaces with respect to each other in one direction only, elastic means for resiliently maintaining said obstacle means in operative position with respect to said cooperating rolling surfaces, and means operatively connected to said obstacle means for placing at will said obstacle means in operative or inoperative position, alternately.

2. A device of the type described for transmitting movement from one part to another part, which comprises, in combination, two members connected to said parts respectively having cooperating respective rolling surfaces arranged to roll upon each other under the effect of relative displacements of said members with respect to each other, two sets of obstacle means respectively adapted to cooperate each with both of said surfaces so as to oppose rolling displacements of said surfaces with respect to each other in one direction only, these two sets of obstacle means being arranged to act in opposite directions respectively, and means for holding one of said obstacle means in operative position for effecting drive during rotation of the driving member in one direction and being adjustable for holding said obstacle means in inoperative position.

3. A device of the type described for transmitting movement from one part to another part, which comprises, in combination, two members connected to said parts respectively, having cooperating respective rolling surfaces, engaging gear means secured to said members so as to ensure rolling movement between said rolling surfaces under the effect of relative displacements of said members with respect to each other, two sets of obstacle means respectively adapted to cooperate each with both of said surfaces for opposing rolling displacements of said surfaces with respect to each other in one direction only, these two sets of obstacle means being arranged to act in opposite directions, respectively, elastic means for resiliently keeping both of said sets of obstacle means in operative position with respect to said cooperating rolling surfaces, and means for bringing either of said sets of obstacle means into inoperative position.

4. A device of the type described for transmitting movement from one part to another part which comprises, in combination, a member having a circular working surface and being operatively connected with one of said parts, at least one member rotatable about the axis of the first mentioned member, operatively connected with the other part and having a cylindrical surface lying eccentrically with respect to said working surface, a ring movably mounted on the cylindrical surface of the second mentioned member and in concentric relation thereto, said ring having also a circular working surface, engaging gear means secured to said first mentioned member and to said ring respectively whereby to insure rolling movement between said working surfaces under the effect of relative displacements of said members about their common axis of rotation, and rolling obstacle means for opposing rolling movement of said working surfaces with respect to each other in one direction only.

5. A device of the type described for transmitting movement from one part to another part which comprises, in combination, a member having a circular inner surface and being operatively connected with one of said parts, at least one member of circular outline eccentrically rotatable about the axis of the first mentioned member and operatively connected with the other part, a ring movably mounted in concentric relation around the circular outline of said second mentioned member, said ring having a circular outer surface, engaging gear means secured to said first mentioned member and to said ring respectively whereby to insure rolling movement between the circular inner surface of the first mentioned member and the circular outer surface of said ring upon each other under the effect of relative displacements of said members about their common axis of rotation, and rolling obstacle means for opposing rolling displacements of said members with respect to each other in one direction only.

6. In a device according to claim 5, one of said members comprising an annulus, the other member comprising a disc arranged within said annulus and eccentrically mounted on one of said parts, a ring mounted on said disc and turnable with respect thereto and engaging the inner surface of said annulus, said ring being of less diameter than the internal diameter of said annulus, said rolling obstacle means comprising rolling members located between said ring and said annulus, said members being of different diameter, and means for holding said members in positions between said ring and said annulus in which the diameter of each member is substantially equal to the space between the ring and the annulus in that position.

7. A device of the type described for transmitting movement from one part to another part comprising, in combination, a member operatively connected to one of said parts and having a circular working surface, at least one other member rotatable about the axis of the first-mentioned member, operatively connected to the other of said parts and having a cylindrical surface lying eccentrically with respect to said working surface, a ring movably mounted on the cylindrical surface of the second-mentioned member and in concentric relation thereto, said ring also having a circular working surface, one of said working surfaces being inside the other and arranged in such manner that the axis of the outer working surfaces lies in the interior of the inner working surface, engaging gear means secured to said first-mentioned member and to said ring, respectively, whereby to ensure rolling movement between said working surfaces under the effect of relative displacements of said members about their common axis of rotation, a plurality of rolling obstacle members of different respective diameters for opposing rolling movement of said surfaces with respect to each other in one direction only, said obstacle members lying in a plane substantially normal to the common plane of the axis of said working surfaces, and means for holding each of said rolling obstacle members in a position in which its diameter is substantially equal to the width of the space between said cooperating working surfaces at such position.

LEO ROBIN.
MATHIEU van ROGGEN.